United States Patent Office 3,118,821
Patented Jan. 21, 1964

3,118,821
CITRIC ACID PRODUCTION
David Sedgefield Clark, Ottawa, Ontario, Canada, assignor to National Research Council, Ottawa, Ontario, Canada, a body corporate of Canada
No Drawing. Filed Apr. 10, 1961, Ser. No. 101,666
18 Claims. (Cl. 195—36)

This invention relates generally to improvements in the production of citric acid by the fermentation of a molasses (or like crude sugar substrate) utilizing a citric acid producing organism. Specifically, the conditioning of the molasses and the growth of the mold are accurately controlled so as to produce consistently high yields and rapid rates of production of citric acid.

It is known that organisms or fungi including the genera Aspergillus, Penicillium and Mucor can be used to produce citric acid by the fermentation of sugar containing media such as beet, cane or citrus molasses. Examples of known useful micro-organisms are *Aspergillus niger, A. ventii, Penicillium citrium, P. luteum, Mucor piriformis* and *Trichoderma lignorm. A. niger* is presently preferred by applicant.

In producing citric acid by fermentation, particularly submerged fermentation, difficulty occurs in obtaining the proper type of mycelium growth required to produce high citric acid yields. So-called mush or filamentous-type growth does not give the desired yield. A pellet-type growth is desirable—as produced by a rapid primary vegetative-like mold growth, followed by a secondary slower growth stage which gives increased citric acid production. It has been shown that aeration during the primary growth stage followed by oxygenation during the secondary growth stage is also desirable (see U.S.P. 2,739,923, March 27, 1956, Martin). Since diluted, but otherwise untreated molasses will not produce the desired pellet-type growth, specific treatments are used to condition the molasses. One treatment (and the only one of concern in this application) involves the addition of ferrocyanide (or ferricyanide) salts. The function of the ferrocyanide has generally been attributed to the removal of assimilable heavy metals (particularly iron) which when present even in small amounts cause the undesirable filamentous growth. There is also some indication that the ferrocyanide has a toxic action on the mold itself which favorably affects citric acid production. The usual procedure is to add an aqueous solution of ferrocyanide to diluted molasses in conjunction with a heat treatment (above 80° C.). A heavy precipitate settles out fairly rapidly. This precipitate may be removed but with most molasses its presence has little effect on the formentation. This treated molasses mash is used for preparing the inoculum and the bulk fermentation medium.

The addition of too small amounts of ferrocyanide ion results in insufficient purification and conditioning—and subsequently in prolonged undesirable vegetative mold growth with low citric acid production. The addition of too large amounts results in restricted mold growth with continued reduced citric acid production throughout the fermentation. The recommended concentrations in the prior art were obtained by preliminary trial-and-error observations of the yield and rate of production of citric acid in full-scale fermentations. Many prolonged test runs were required in order to determine the optimum concentrations for the particular materials and set of conditions used. However, experience has shown that even when the selected conditions were maintained, a considerable number of failures and large variations in yields between duplicate fermentation batches, occurred.

An object of this invention is to provide uniformly high yields of citric acid from each fermentation batch. A further object is to obtain uniformly high yields while avoiding extensive trial-and-error testing and rigorous controls. Another object is to provide simple yet effective methods of controlling the ferrocyanide (or ferricyanide) ion concentration at various stages of the process to maintain uniformly high yields. Another object is to increase the rate of production of citric acid.

It has now been found that many factors affect the amount of ferrocyanide ion required for complete purification and precipitation. These factors include type, crop year and location of molasses, method of sterilization of diluted molasses, temperature history between dilution and fermentation, and pH of the mash. The decomposition of aqueous ferrocyanide solutions, settling and layering of stored molasses, the inherent errors in the concentration measurements of the ingredients and the mineral content of the water used, all introduce further difficulties in arriving at the optimum ferrocyanide concentration. These factors cannot be controlled from batch to batch to the degree necessary to give uniform ferrocyanide ion requirements. Thus preliminary trial-and-error test runs will not give the optimum amount of ferrocyanide ion required for one initial addition, because this amount will vary for each batch. Therefore, these processes involving treatment with ferrocyanide are impractical without special ferrocyanide control steps.

It has further been found that uniformly high citric acid yields require the presence of residual ferrocyanide ion within specific concentration ranges in the fermentation medium during both the primary (growth) stage and the secondary (citric acid producing) stage. The specific residual ranges are relatively independent of the many factors listed above which affect the amount of ferrocyanide required for complete precipitation. The specific residual range may vary with molasses type, with organism used, and with major changes in process conditions; the exact limits are easily determined by preliminary tests, if desired. A difference of $10 \times 10^{-6}$ gm. ferrocyanide ion per ml. of mash has now been found to have a significant effect on citric acid yields when the concentration is near the outside limits of the range. It would be impossible in practice to arrive at these specific residual concentrations by one initial addition of ferrocyanide with any degree of consistency. In the prior art the ferrocyanide ion concentration in molasses media during the primary and secondary fermentation stages was not studied and its significance was not realized. In explanation, it is believed that the presence of ferrocyanide ion within specific concentration ranges conditions the mold during the primary growth stage to produce the pellet-type mycelium, and to give high citric acid yields. Subsequent adjustment of the ion concentration during the secondary stage favors citric acid production to the optimum degree. It is believed that on the one hand, ferrocyanide ion has a direct toxic action on the growth of the mold, and on the other hand has a conditioning effect on the metabolic activity of the mold which favors citric acid production. The specific ferrocyanide concentrations required for a desirable balance of these influences differ somewhat depending in particular on the molasses used.

According to the present invention ferrocyanide (or ferricyanide) ion is added in the earlier stages of the mash preparation in amounts in excess of that required for complete precipitation. Before the primary growth stage of the fermentation, the ferrocyanide ion concentration is measured and adjusted to within a specific residual range. The measurement-adjustment step at this stage is optional in certain cases as will be explained below. After the primary growth stage (when the desired pellet-type mycelium has been obtained) but before oxygenation, the ferrocyanide ion concentration is measured and adjusted to a specific range or to below a maximum limit. If a measurement was made before the primary growth stage, the measurement and adjustment before the secondary stage is optional (depending on the residual amount present). The substantial absence of ferrocyanide ion during the secondary stage is necessary for high citric acid yields with beet molasses. However, with cane molasses, it is necessary that the conditioning effect and toxic action be continued throughout the fermentation and thus the presence of some ferrocyanide ion during the secondary stage is important, if high citric acid yields are to be realized.

The uniformly high yields can be maintained if the specific range of ferrocyanide ion during the primary growth stage is from about 10 to about 200 $\gamma$/ml. ($10-200 \times 10^{-6}$ gram $Fe(CN)_6 \equiv$ per millilitre of mash or p.p.m.), preferably about 10 to about 100 $\gamma$/ml.

For beet molasses, during the secondary growth stage the ferrocyanide ion concentration should be less than about 20 $\gamma$/ml. (preferably zero). If the concentration during the primary stage is from about 10 to about 40 $\gamma$/ml., the concentration during the secondary stage will normally have fallen to below 20 $\gamma$/ml. Thus, if the concentration is measured before the primary stage and adjusted to be within the range of about 10 to about 40 $\gamma$/ml. no further measurement or adjustment need be made. Alternatively, one initial addition of ferrocyanide can be made calculated to give about 40 to about 100 $\gamma$/ml. residual excess. Without any measurement before the primary growth stage—it can be safely assumed that the residual will be somewhere within the range 10–200 $\gamma$/ml. It is then necessary to measure the concentration before the secondary stage and adjust to below about 20 $\gamma$/ml. If a seed inoculum is used (prepared with about 5 to about 80 $\gamma$/ml. excess), the concentration during the primary stage can range up to about 400 $\gamma$/ml. (and consistently high yields still be realized) as long as the concentration is decreased to less than about 20 $\gamma$/ml. before oxygenation (see Example 10 below).

For cane molasses, during the secondary citric acid producing stage the ferrocyanide ion should be between about 10 and about 200 $\gamma$/ml. If the concentration during the primary stage is from about 30 to about 150 $\gamma$/ml, no further adjustment for the secondary stage need be made. Results for cane molasses indicate that there is some advantage in growing the pellet-type mycelium (primary stage) in the presence of about 10 to about 40 $\gamma$/ml. and then increasing the concentration to from about 40 to about 150 $\gamma$/ml. for the secondary stage.

The above concentrations may vary by about 5 $\gamma$/ml. due to the factors previously mentioned, and to inaccuracies in the measurement method used.

It will be apparent that the process of the present invention comprises the steps of (a) preparing an inoculum by germinating spores of a citric acid producing and accumulating organism (preferably *A. niger*) in a seed mash (b) transferring at least part of the inoculum to a main mash, (c) effecting aeration of the fermentation medium while adjustment of the ferrocyanide ion concentration is used to control the growth and the conditioning of the organism, and (d) retarding mycelium growth while increasing citric acid production by oxygenation (as hereinafter defined) and by ferrocyanide control.

Optionally, the process further comprises maintaining the fermentation medium during the secondary citric acid producing stage under superatmospheric total pressure with an oxygen pressure of above 1.0 atmosphere (more preferably 1.3–1.8 atm.).

While individual fermentations can be initiated from spores and completed in the one mash—it is preferred to prepare a seed mash. This seed mash is prepared by diluting molasses with water (usually to 8–30 wt. percent sugar). Heat sterilization is usually carried out. Excess ferrocyanide ion is added to the mash and complete precipitation effected. The pH is desirably maintained throughout at 5–8 (more preferably 5.5–6.5). The mash may be supplied with nutrient salts as is known in the art. A water-soluble phosphate nutrient would be suitable. The ferrocyanide ion concentration is adjusted just before inoculation to give a specific residual (for beet molasses about 5 to about 80 $\gamma$/ml.—see Example 8. Cane molasses will tolerate considerably more). A citric acid producing and accumulating organism (preferably *A. niger*) is then added and incubation is allowed to take place. Aeration and agitation during incubation may be sufficiently effected by using a mechanical shaker, air diffusing into the flash from the atmosphere. However, the air may be forced or bubbled through the mash to cause aeration and agitation. The development of the organism is permitted until a suitable growth and concentration of spores is present (see Steel et al., Can. J. Microbiol. 1, 150–157 (1954)). It has been found that the preferred concentration of spores is from 3 million to 9 million for every 1500 ml. of mash. The inoculum development to this suitable stage for transfer usually takes place within 18–30 hours at 20–35° C.

The main mash is prepared similarly to the seed mash with the pH desirably maintained within the range 5–9 (more preferably 6.5–7.5). The specific residual concentration of ferrocyanide ion is provided just before inoculation. Inoculum from the seed mash is added in amounts less than 10% by volume. It is preferred to add from 150,000 to 300,000 seed pellets to each litre of mash. Aeration is carried out during the primary growth stage (the first 15–30 hours). The dispersing of air should be effected carefully to assure that all portions of the mash are being continually fed with air. One suitable manner of accomplishing this is to introduce the air through an aeration disk at the bottom of the fermentation vessel. The subsequent oxygenation may be similarly effected. Foaming may become objectionable at the beginning of the fermentation. Mechanical foam breakers or the addition of anti-foam agents such as corn oil, 3% octadecanol in paraffin oil, lard oil, or silicones will usually alleviate this problem.

Experience has shown for beet molasses particularly, that when the mycelium growth appears as smooth pellets, creamy white in color and of 1–2 mm. in diameter it is desirable to cease the aeration and commence oxygenation (usually after about 24 hours). Oxygenation, as used in this specification, means exposing the entire fermentation medium to an oxygen-containing gas at a total pressure of one atmosphere or above with an oxygen pressure of at least about 0.8 atm. Desirably superatmospheric total pressures with oxygen pressures of about 1.0 to 1.8 atm. are used. More preferably oxygen itself and a pressure of from 1.3–1.7 atm. are used.

This increased availability of excess oxygen has the effect of increasing the rate of citric acid production especially during the earlier stages. Also, when increased pressures are used, the actual flow rate can be decreased without affecting the yield. It is believed that in some of these systems the rate-determining step is the rate of $O_2$ transfer across the gas-liquid interface. Increased $O_2$ pressures would tend to increase this latter rate. The unused oxygen escaping from the fermenter can be scrubbed free of carbon dioxide and recycled. No other substances poisonous to the reaction have been found to build up in the recirculated stream. A small fraction of the oxygen feed is actually utilized by the micro-organism in one pass through the fermenter, making the recirculation of the oxygen economically desirable.

The oxygenation is carried on throughout the secondary citric acid-producing stage of the process (for about 50–160 hours). The total aeration-oxygenation time (from inoculation) giving a desirable yield, may range from 65 to 190 hours. The citric acid is recovered at the end of the fermentation by any conventional method.

The ferrocyanide (or ferricyanide) ion is added as a water-soluble salt of a suitable cation such as sodium or potassium. Potassium ferrocyanide is presently preferred. For beet molasses, the proportion of potassium ferrocyanide which when added initially will usually result in a suitable excess, ranges from about 0.4 to 2.0 gms. $K_4Fe(CN)_6 \cdot 3H_2O$ per litre of mash (for about 12% sugar in the mash). The addition may be made as ferricyanide ion in which case it will normally be substantially all reduced to ferrocyanide in the mash. The $Fe(CN)_6$ radical is apparently responsible for the effect. Cane molasses usually requires at least twice the amount of ferrocyanide (compared to beet) for complete purification.

The adjustment of the ferrocyanide ion concentration after the initial over-treatment is accomplished without affecting the fermentation (1) by heating the mash before inoculation to remove the excess ferrocyanide ion, and, if completely removed, then adding the specific residual amount, or (2) by adding the stoichiometric amount of a heavy metal ion (which forms an insoluble precipitate with ferrocyanide), to precipitate the excess in whole or in part—either before or after inoculation. It is not necessary to remove the precipitated excess from the mash. Usually heating to about 120° C. for about 30 minutes will remove all the excess ion. For high pH's or large volumes more drastic heating may be necessary. Suitable heavy metal ions include zinc, copper, and cadmium. Silver can be used, but some heating is required. The use of zinc ion is preferred, with copper ion also being desirable. Other methods such as ones involving high oxygenation or ultrasonic vibration can remove ferrocyanide ion, but are not preferred in this process.

The measurement of the residual ferrocyanide ion concentration was carried out by the method of Marier and Clark—"The Analyst," J. Soc. Anal. Chem., vol. 85, No. 1013, pp. 574–579 (1960). The accuracy of this method is ±3 $\gamma$/ml.

The diluted molasses mash is preferably sterilized before peparing the inoculum or the bulk fermentation medium. By sterilization is meant treatment in which all or substantially all of the undesirable microorganisms are destroyed, but some harmless ones may remain viable. This sterilization is customarily effected by heating—and can be carried out previous to or concurrently with the heat treatment accompanying the ferrocyanide precipitation.

The temperature at which the inoculum preparation and the main fermentation are carried out may range from about 20 to about 35° C. In the following examples the inoculum was grown at 29° C. and the main fermentation carried out at 31° C.

The yields of citric acid are determined as percent citric acid (wt./vol. of medium) or percent conversion of available sugar to anhydrous citric acid (wt./wt.). Using the ferrocyanide control of the present invention conversions of above 70% are consistently obtained in less than 200 hours. An increased oxygenation pressure (preferably 1.3–1.8 atm. $O_2$) can shorten this time.

Various sequences of steps in effecting the ferrocyanide control can be used, as will be apparent from the above explanation. Examples include:

(1) Diluting molasses, heat sterilizing, treating while hot with excess ferrocyanide, cooling while precipitation is completed, reheating (if the residual is above the specific range) until the excess ferrocyanide is destroyed (or until the residual is decreased to the desired value), cooling, adding the specific residual ferrocyanide and subsequently adjusting the residual just before oxygenation (by adding the heavy metal ion, or more ferrocyanide, as desired).

(2) Diluting molasses, adding excess ferrocyanide, heating to effect precipitation, sterilization and removal of excess ferrocyanide ion simultaneously, cooling, adding the specific residual ferrocyanide (etc. as in (1)).

(3) Diluting, sterilizing by heat, gradually adding with agitation, while hot, the ferrocyanide until (after complete precipitation) a slight measured excess occurs (below the specific residual), cooling, adding the desired residual (etc. as in (1)).

(4) Diluting molasses, heat sterilizing, adding excess ferrocyanide while hot, allowing to stand to complete precipitation, measuring the residual ferrocyanide concentration, adding the stoichiometric amount of a heavy metal ion, as required, to lower the residual to the specific range (etc. as in (1)).

(5) Diluting molasses, heat sterilizing, adding an amount of ferrocyanide calculated to give about 40–100 $\gamma$/ml. residual, to the hot mash, allowing to stand to complete precipitation, and (a) for beet molasses adjusting the residual to about 10 to about 40 $\gamma$/ml. before inoculation (no further ferrocyanide control step need be carried out) or (b) for beet molasses adjusting to below 20 $\gamma$/ml. just before oxygenation, or (c) for cane molasses maintaining the residual above about 10 $\gamma$/ml. during oxygenation (more preferably 20–150 $\gamma$/ml. Other variations can be made in the process sequence (including deletion of optional steps) as will be apparent to one skilled in the art.

Examples 1 to 6 illustrate the variation in ferrocyanide ion required for complete precipitation and purification with some of the many economically uncontrollable factors mentioned above. The ferrocyanide ion was added as a 20% wt./vol. aqueous solution of $K_4Fe(CN)_6 \cdot 3H_2O$. The yields are expressed as wt. percent citric acid per vol. of medium.

EXAMPLE 1

This example shows the variation in required ferrocyanide with crop year of molasses. Chatham Ontario beet molases was used. The mash was prepared using the process sequence outlined for Examples 7 and 8 below.

*Table I*

| Crop year: | $K_4Fe(CN)_6 \cdot 3H_2O$ required to give about 40 $\gamma$/ml. residual $Fe(CN)_6\equiv$, gm./l. |
|---|---|
| 1957 | 0.45 |
| 1958 | 0.60 |
| 1959 (barrel 1) | 0.70 |
| 1959 (barrel 2) | 0.95 |

Molasses samples from different crop years were found to differ considerably in ferrocyanide consumption. In fact two different samples from one crop year differed by 0.25 gm./l. (which equals 250 $\gamma$/ml.). The differences involved are large enough to cause the residual excess to be frequently outside the optimum range for beet molasses tested (about 10–40 $\gamma$/ml.) which would not require adjustment before oxygenation.

EXAMPLE 2

In spite of the differences in the amount of ferrocyanide required for complete precipitation, the three molasses of Example 1 fermented equally well when ferrocyanide control was used as shown in Table II. The procedure followed that described for Example 7 below.

Table II

CITRIC ACID YIELD PERCENT (AVERAGE OF TWO 140 HR. FERMENTATIONS)

| Molasses crop year | Initial ferrocyanide residual, γ/ml. | | | | |
|---|---|---|---|---|---|
| | 0 | 10 | 20 | 40 | 80 |
| 1957 | 5.20 | 10.46 | 9.16 | 9.00 | 6.30 |
| 1958 | 4.30 | 9.62 | 9.24 | 7.20 | 5.40 |
| 1959 | 4.80 | 9.40 | 8.05 | 5.70 | 6.00 |

It should be noted that the optimum residual range for 1957 molasses extends further than for the other two years (where no adjustment is made before oxygenation). 10 and 20 γ/ml. residual gave high yields for all three. Thus the specific optimum range may vary with molasses used. The range from about 10 to about 40 γ/ml. was an optimum range for all beet molasses tested, with no adjustment before oxygenation normally being necessary.

EXAMPLE 3

The ferrocyanide residual concentration decreases at an increasing rate with increase in acidity. The effect of pH of molasses on amount of residual ferrocyanide is illustrated in Table III. (Tests made with 1500 ml. quantities of Chatham 1959 beet molasses mash in 6.1 flasks.)

Table III

| pH | Initial $K_4Fe(CN)_6 \cdot 3H_2O$ added, gm./l. | Ferrocyanide residual, γ/ml. |
|---|---|---|
| 7.0 | 0.75 | 47 |
| 6.0 | 0.75 | 42 |
| 5.0 | 0.75 | 35 |
| 4.0 | 0.75 | 17.5 |

Although the effect is relatively small between pH 5 and 7, the difference could be sufficient to shift the residual outside the optimum range. Ferrocyanide ion control should be more important in processes using highly acidified molasses.

EXAMPLE 4

Differences in the ferrocyanide residual concentration result from normal human and process errors. The variation is illustrated in Table IV.

Table IV

| Flask No. | Initial $K_4Fe(CN)_6 \cdot 3H_2O$ Added, gm./l. | Ferrocyanide residual, γ/ml. |
|---|---|---|
| 1 | 0.95 | 30.4 |
| 2 | 0.95 | 30.0 |
| 3 | 0.95 | 26.5 |
| 4 | 0.95 | 39.5 |
| 5 | 0.95 | 30.0 |
| 6 | 0.95 | 40.0 |

Only one weighing of Chatham 1959 beet molasses was made; 2160 gms. of molasses made up to 9 l., mixed and dispersed in 1500 ml. quantities into 6 flasks; all flasks sterilized together and treated immediately upon removal from the autoclave with ferrocyanide.

A spread of 13.5 γ/ml. occurred which is enough to cause the residual to be outside the specific optimum range for this molasses. In this example, the residuals in flasks 4 and 6 were outside the optimum range for this molasses (see Table II), and would give relatively poor citric acid yields (when no adjustment is made before oxygenation).

EXAMPLE 5

This example illustrates the differences in ferrocyanide residual concentration between mash made from different weighings of the same well-mixed Chatham 1959 beet molasses stock.

Table V

| Weighing No. | Initial $K_4Fe(CN)_6 \cdot 3H_2O$ added, gm./l. | Ferrocyanide residual, γ/ml. (average of 4 flasks) |
|---|---|---|
| 1 | 0.97 | 30.1 |
| 2 | 0.97 | 40.3 |
| 3 | 0.97 | 33.0 |

Molasses mash prepared from weighing 1 would give high citric acid yields without adjustment before oxygenation whereas weighing 2 would give significantly lower yields.

EXAMPLE 6

Some settling or layering appears to occur in stored molasses stock. If the stock is not mixed thoroughly before portions are withdrawn for mash preparation—different ferrocyanide residuals will result. The closer the sample is taken to the bottom of the container, the greater the amount of ferrocyanide required to complete precipitation. This effect occurs in both metal and glass containers.

The results shown in Table VI are those obtained from 1.6 liter samples withdrawn from 5 l. Chatham 1959 beet molases stock stored in a 12 l. flask (total depth 5 in.) for 6 months at 32° C. The samples were diluted to 12 wt. percent sugar concentration (9.1), sterilized, and treated with ferrocyanide.

Table VI

| Depth from bottom | Initial $K_4Fe(CN)_6 \cdot 3H_2O$ Added, gm/l. | Ferrocyanide residual, γ/ml. |
|---|---|---|
| 4 in | 0.55 | 15 |
| 3 in | 0.55 | 9 |
| 1 in | 0.55 | 0 |

A number of other factors as mentioned above, can also affect the ferrocyanide residual concentration and thus the citric acid yield. The variations illustrated for beet molasses are even greater for cane molasses. It is evident that constant initial additions of ferrocyanide cannot give uniform ferrocyanide residual concentrations, and hence cannot give consistently high yields of citric acid (without adjustment at some stage).

Examples 7 and 8 illustrate citric acid yields where heat is used in ferrocyanide control, according to the present invention. In these examples *A. niger* (strain NRC A–1–233, NRC publication No. 2359—otherwise termed U. of Wisconsin strain 72–4) and Chatham 1959 beet molasses were used.

Molasses was diluted with tap water to 12% sugar concentration and the pH adjusted to 6.0 with HCl. Five liter quantities in 12 l. flasks were sterilized for 45 min. at 120° C. and treated while hot with 3 gm. of $$K_4Fe(CN)_6 \cdot 3H_2O$$

(0.6 gm./l.) added in the form of a 20% aqueous solution. After cooling to room temperature the mash in the various flasks was found to contain a ferrocyanide residual ranging from 30 to 50 γ/ml. (except where otherwise noted). The flasks were reheated to 120° for 30 min. to remove all the measurable ferrocyanide and cooled to room temperature again. The pH was adjusted to 6.5 and the ferrocyanide added to the desired level. The mash was distributed in 2.5 l. quantities into glass tower fermenters, inoculated at the rate of 200,000 pellets per liter, and aerated (through a medium-porosity disc at the bottom of the tower) for 24 hours with air and then with oxygen to a complete 140 hour fermentation. The flow rate in both instances was 700 cc./min. The temperature was controlled at 31° C. Inoculation was made with 22-hour-old pellets grown at 29° C. in 1500 ml. quantities of medium prepared as described above with the initial ferrocyanide residual set at 20 γ/ml.

EXAMPLE 7

The effect of the ferrocyanide residual concentration at the beginning of the fermentation on citric acid yield is shown in Table VII. Maximum yields were obtained with the residual between 10 and 26 $\gamma$/ml.

Table VII

| Ferrocyanide residual, $\gamma$/ml. | No. of Fermentations | Average yield (140 hours) | |
|---|---|---|---|
| | | Percent citric acid | Percent conversion of available sugar |
| 0 | 5 | 4.30 | 35.8 |
| 5 | 5 | 5.66 | 47.2 |
| 10 | 6 | 9.62 | 80.2 |
| 15 | 6 | 9.70 | 80.8 |
| 20 | 7 | 9.24 | 77.0 |
| 26 | 2 | 9.50 | 79.2 |
| 40 | 4 | 7.20 | 60.0 |
| 60 | 4 | 7.30 | 60.8 |
| 80 | 2 | 5.40 | 45.0 |
| 168 | 2 | 5.20 | 41.7 |

EXAMPLE 8

The effect of the initial ferrocyanide residual (before addition of spores) in the inoculum mash on subsequent main mash fermentations is shown in Table VIII. The results show that even though the ferrocyanide residual in the main mash is at the desired level, the initial residual in the inoculum mash affects the citric acid yields. In Table VIII the "NaOH required" is directly proportional to citric acid yield. The best fermentation resulted when the inoculum pellets were grown in a seed mash initially containing 20 $\gamma$/ml. residual. High concentrations of initial residual in the seed mash resulted in underdeveloped pellets which produced citric acid slowly.

Table VIII

ML. OF N/10 NaOH REQUIRED TO NEUTRALIZE 1 ML. OF MAIN MASH

| Age (hrs.) | Initial ferrocyanide residual in inoculum, $\gamma$/ml. | | | | |
|---|---|---|---|---|---|
| | 0 | 5 | 20 | 60 | 180 |
| 44 | 3.26 | 3.54 | 4.72 | 3.95 | 2.30 |
| 68 | 6.78 | 7.85 | 10.55 | 8.38 | 5.73 |
| 92 | 9.80 | 12.01 | 16.00 | 11.95 | 8.73 |
| 116 | 12.15 | 15.25 | 18.60 | 14.26 | 11.12 |
| 140 | 14.50 | 17.90 | 19.00 | 16.00 | 13.50 |

Examples 9 to 11 illustrate the citric acid yield where ferrocyanide control by addition of a heavy metal ion (zinc added as a 5% wt./vol. aqueous solution of $ZnSO_4 \cdot 7H_2O$) is carried out. The procedure followed that described for Example 7 above, except when the ferrocyanide control was effected by adding zinc ion.

EXAMPLE 9

Chatham 1959 beet molasses was prepared into a mash having an excess ferrocyanide of 100 $\gamma$/ml. (too high for good yields without removal before oxygenation). The stoichiometric proportion of zinc sulphate was added to lower the excess ferrocyanide ion to 15 $\gamma$/ml. (The $Zn^{++}$ and $Fe(CN)_6^{\equiv}$ combine in the ratio 1.5:1 respectively). The 15 $\gamma$/ml. excess was again confirmed by test, and the molasses then inoculated and fermented in the usual manner. No adjustment was made before oxygenation. Comparative results are shown in Table IX. There was no significant difference in citric acid yields between using heat and $Zn^{++}$ to remove the excess ferrocyanide before inoculation.

Table IX

PERCENT CITRIC ACID AFTER 140 HR. (2.5 LITER FERMENTATIONS)

| Exp. No. | Molasses containing 100 $\gamma$/ml. $Fe(CN)_6^{\equiv}$ excess | Molasses originally containing 100 $\gamma$/ml. $Fe(CN)_6^{\equiv}$ | |
|---|---|---|---|
| | | Excess $Fe(CN)_6^{\equiv}$ removed with heat to 15 $\gamma$/ml. | Excess $Fe(CN)_6^{\equiv}$ removed with Zn ion to 15 $\gamma$/ml. |
| 1 | 7.9 | 10.6 | 10.3 |
| 2 | 7.6 | 9.7 | 9.9 |
| 3 | 7.2 | 9.6 | 8.7 |

EXAMPLE 10

In this example, the ferrocyanide ion concentration in the main mash was adjusted immediately before inoculation or immediately before oxygenation. Chatham 1959 beet molasses was used.

Table X

CITRIC ACID YIELD AFTER 140 HR., PERCENT

| Initial ferrocyanide residual in mash, $\gamma$/ml. | No change made in ferrocyanide conc. (control) | Ferrocyanide conc. reduced to 15 $\gamma$/ml. immediately before inoculation by stoichiometric addition of $Zn^{++}$ | Ferrocyanide conc. reduced to 15 $\gamma$/ml. at 24 hr. period of fermentation by stoichiometric addition of $Zn^{++}$ |
|---|---|---|---|
| 15 | 10.5 | | |
| 100 | 3.7 | 8.9 | 9.6 |
| 200 | 4.5 | | 8.7 |
| 400 | 3.2 | | 8.2 |

When the ferrocyanide residual was 15 $\gamma$/ml. before inoculation, good yields were obtained (even without adjustment before oxygenation). When 100 $\gamma$/ml. residual was present before inoculation, a low yield was obtained unless adjustment was made either before inoculation or just before oxygenation. At 200 and 400 $\gamma$/ml. residuals poor yields (and too restricted a mycelium growth) were obtained unless adjustment was made before oxygenation. However, at 400 $\gamma$/ml. even with this adjustment, the yields tended to decrease.

EXAMPLE 11

The variation in citric acid yield, with variation in ferrocyanide concentration at the start of the oxygenation, has been followed throughout the secondary stage of the fermentation. The ferrocyanide residual in the mash at inoculation was 100 $\gamma$/ml. and was reduced to the values designated at the 24 hour period (just before oxygenation) by addition of the stoichiometric amount of $Zn^{++}$. These values were maintained throughout the fermentation. Chatham 1959 beet molasses was used.

Table XI

CITRIC ACID YIELD, PERCENT

| Age, hr. | Ferrocyanide ion concentration from 24 hr. period onward, $\gamma$/ml. | | | | | | |
|---|---|---|---|---|---|---|---|
| | 0 | 10 | 20 | 30 | 40 | 60 | 100 |
| 72 | 5.1 | 5.0 | 4.8 | 3.2 | 3.7 | 3.0 | 3.0 |
| 96 | 6.7 | 7.1 | 6.6 | 4.90 | 5.20 | 4.6 | 3.0 |
| 116 | 8.9 | 8.5 | 8.4 | 6.70 | 6.7 | 6.3 | 3.3 |

At ferrocyanide concentrations above about 20 γ/ml. (at the start of oxygenation) the yields decreased significantly.

Examples 12-15 illustrate the effect of oxygen pressure and recirculation on citric acid yields. The experiments were carried out using 20 liters of mash in 36-liter tower fermenters.

EXAMPLE 12

Increasing the oxygen pressure above one atmosphere during the secondary stage of the fermentation has a beneficial effect even at high flow rates. Table XII illustrates the increase in final citric acid yield. Pressures above about 1.8 atm. resulted in reduced yields.

*Table XII*

| Oxygen pressure (atm.): | Anhydrous citric acid, percent |
|---|---|
| 1.0 | 8.30 |
| 1.3 | 8.85 |
| 1.7 | 9.30 |
| 2.0 | 7.75 |

(Av. of two 116-hour fermentations, 1957 Chatham beet molasses, $O_2$ flow 7,000 cc./mm. Inoculation pellets 200,000/l., initial ferrocyanide residual 25 γ/ml.).

EXAMPLE 13

Further data is given on the effect of increased oxygen pressure. Citric acid yields were increased in every instance. In Table XIII, Experiment Nos. 1 and 2, there was a marked increase in the rate of fermentation. Other process details were as in Example 12. The controls were run with $O_2$ at atmospheric pressure.

*Table XIII*

| Exp. No. | Time, hrs. | $O_2$ Pressure, p.s.i.g. | Anhydrous citric acid, percent | | Conversion of available sugar to anhydrous citric acid, percent | |
|---|---|---|---|---|---|---|
| | | | Test | Control | Test | Control |
| 1 | 43 | 5 | 2.70 | 1.62 | 22.5 | 13.50 |
| | 67 | (1.3 atm.) | 6.90 | 5.10 | 57.5 | 42.50 |
| | 92 | | 8.75 | 8.35 | 74.9 | 71.30 |
| | 117 | | 9.20 | 8.60 | 78.6 | 73.59 |
| 2 | 45 | 8 | 2.90 | 1.96 | 24.2 | 16.30 |
| | 69 | (1.5 atm.) | 8.50 | 5.65 | 70.1 | 47.10 |
| | 95 | | 9.90 | 7.60 | 82.5 | 63.30 |
| | 119 | | 10.10 | 8.80 | 83.4 | 73.30 |
| 3 | 49 | 10 | 3.35 | 3.15 | 27.60 | 26.29 |
| | 66 | (1.7 atm.) | 6.93 | 6.18 | 57.75 | 51.50 |
| | 92 | | 9.45 | 9.25 | 78.70 | 77.00 |
| | 113 | | 10.00 | 9.75 | 83.30 | 81.20 |

EXAMPLE 14

The effect of variations in oxygen pressure and flow rate on citric acid yield have been investigated. The results in Table XIV show that, within limits, increased oxygen pressure can be substituted for a high flow rate. Reasonably high yields can be obtained with increased pressure, even when the flow rate is reduced to ⅔ of the desirable value without increased pressure. The increased pressure has its greatest effect on production early in the fermentation (see percent Diff. column) which is important in getting the most efficient use of the sugar in the short-cycle batch process. The results suggest that increased oxygen pressure need only be used during the first half of the fermentation to achieve maximum yields.

*Table XIV*

| Exp. No. | Age, hr. | $O_2$ flow rate, cc./min. | Anhydrous citric acid, percent | | |
|---|---|---|---|---|---|
| | | | 1.7 atmos. $O_2$ pressure | 1.0 atmos. $O_2$ pressure | Diff., percent |
| 1 | 67 | 7,000 | 5.60 | 5.20 | 7.7 |
| | 92 | | 6.90 | 6.65 | 3.8 |
| | 116 | | 8.32 | 7.85 | 6.0 |
| 2 | 67 | 3,600 | 5.40 | 4.25 | 35.3 |
| | 92 | | 6.72 | 5.60 | 20.0 |
| | 116 | | 8.00 | 6.75 | 18.51 |
| 3 | 67 | 2,500 | 5.24 | 3.63 | 44.4 |
| | 92 | | 6.60 | 5.20 | 26.9 |
| | 116 | | 7.80 | 6.40 | 21.9 |
| 4 | 67 | 1,500 | 4.30 | 3.50 | 22.9 |
| | 92 | | 4.50 | 3.60 | 25.0 |
| | 116 | | 4.60 | 3.40 | 35.3 |

NOTE.—Molasses, Chatham 1958 beet. Inoculation pellets 200,000/l. Initial ferrocyanide residual 25γ/ml.

EXAMPLE 15

It was found that the oxygen could be recirculated without accumulation of substances poisonous to the fermentation. Carbon dioxide gas, the by-product of the mold's respiration during fermentation, was continuously removed from the gas stream by bubbling the gas through an aqueous 20% solution of sodium hydroxide. The average difference in yield between test and control (no recirculation) in Table XV was neglible.

*Table XV*

| Exp. No. | Anhydrous citric acid, percent | | Conversion of available sugar to anhydrous citric acid, percent | |
|---|---|---|---|---|
| | Test | Control | Test | Control |
| 1[a] | 8.0 | 8.13 | 66.6 | 67.0 |
| 2[a] | 7.4 | 7.6 | 67.0 | 69.0 |
| 3[a] | 10.4 | 10.3 | 86.6 | 85.0 |
| 4[a] | 9.9 | 9.6 | 82.5 | 80.0 |
| 5[a] | 9.7 | | 80.8 | |
| 6[a] | 9.9 | | 82.5 | |
| 7[a] | 10.2 | | 85.0 | |
| 8[a] | 9.8 | 9.5 | 84.5 | 83.3 |
| 9[a] | 10.0 | 10.4 | 83.8 | 85.5 |
| 10[b] | 7.5 | 7.8 | 62.5 | 66.0 |
| 11[b] | 6.9 | 7.6 | 62.2 | 64.0 |

[a] Age 140 hours. Molasses Chatham beet 1957, $O_2$ flow, 7000 cc./min. Pellets 200,000/l. Temperature 31° C. Initial ferrocyanide residual 25 γ/ml.
[b] Age 113 hours. Temperature 28° C. (Other details as in (a).)

Economies in process operation can be attained using increased oxygen pressure and recirculation. A faster rate of acid production can be obtained, and all the oxygen supplied can be used.

EXAMPLE 16

This example illustrates the improved citric acid yields obtained using ferrocyanide control with cane molasses. "Final blackstrap" molasses was used. The mash was prepared as before except that 1.6 gms./l. of $$K_4Fe(CN)_6 \cdot 3H_2O$$

was required to give a suitable residual and inoculation was made with 160,000 pellets per liter of mash. In this example the inoculation pellets were grown in beet molasses mash as it was found to be somewhat less easy to grow a desirable inoculum in cane molasses mash within a short time. Other process details were as described for Example 7. The residual ferrocyanide was adjusted to the various values shown at inoculation and the yield followed throughout the fermentation. The results are shown in Table XVI.

Table XVI
CITRIC ACID, PERCENT

| Age, hr. | Fe(CN)$_6^{\equiv}$ concentration in mash at inoculation, γ/ml. | | | | | |
|---|---|---|---|---|---|---|
| | 0 | 10 | 20 | 80 | 150 | 260 |
| 92 | | | 4.25 | 4.10 | 3.35 | 2.80 |
| 116 | 2.10 | 2.30 | 5.75 | 5.60 | 4.75 | 3.90 |
| 140 | 2.70 | 2.90 | 7.10 | 6.92 | 6.00 | 5.05 |
| 168 | 2.95 | 3.25 | 8.10 | 8.05 | 7.20 | 6.10 |
| 192 | 2.95 | 3.42 | 9.00 | 8.90 | 8.10 | 7.00 |

The results indicate that satisfactory yields were obtained within a range of about 10–200 γ/ml. at inoculation.

EXAMPLE 17

The citric acid yields for cane (final blackstrap) molasses with various ferrocyanide residuals during oxygenation are illustrated. The ferrocyanide residual for the first 24 hours (during aeration) was 20 γ/ml. and the residuals during oxygenation were as shown in Table XVII. Other details were as in Example 16.

Table XVII
CITRIC ACID, PERCENT

| Age, hr. | Fe(CN)$_6^{\equiv}$ concentration in mash during oxygenation, γ/ml. | | | | | |
|---|---|---|---|---|---|---|
| | 0 | 20 | 80 | 150 | 200 | 300 |
| 92 | | 4.25 | 5.10 | 4.50 | 3.0 | 2.70 |
| 116 | 2.0 | 5.75 | 6.80 | 6.05 | 3.85 | 3.50 |
| 140 | 2.5 | 7.10 | 8.40 | 7.50 | 5.00 | 4.50 |
| 168 | 2.6 | 8.10 | 9.20 | 8.50 | 5.75 | 5.25 |
| 192 | 2.5 | 9.00 | 9.80 | 9.20 | 6.65 | 6.10 |

When the ferrocyanide was much below 20 γ/ml. low yields resulted even after 192 hours. At 200 γ/ml. the yields also decreased, indicating an optimum range of about 20–150 γ/ml. during oxygenation.

Examples 16 and 17 indicate that it is desirable with cane molasses to provide a residual of about 10–50 γ/ml. during aeration and then increase the residual to from 50–150 γ/ml. during oxygenation.

The above examples illustrate the advantages of the present invention in terms of citric acid yield, time of fermentation, avoidance of trial-and-error testing, and avoidance of oxygen wastage. The examples are not intended to limit the scope of the invention, which is defined in the appended claims.

I claim:

1. A process for the production of citric acid by fermentation of a sugar-containing medium wherein ferrocyanide ion is utilized to purify the medium and condition the mold which comprises controlling after purification the residual ferrocyanide ion to provide at inoculation a concentration of ferrocyanide ion of from about 10 to about $400 \times 10^{-6}$ gm./ml. of medium; and for the secondary citric-acid-producing stage providing a ferrocyanide ion concentration of less than about $20 \times 10^{-6}$ gm./ml. for beet molasses media, and from about 10 to about $200 \times 10^{-6}$ gm./ml. for cane molasses media.

2. A process for the production of citric acid by fermentation comprising preparing a seed mash by diluting molasses with water, treating with a water-soluble ferrocyanide in excess of that required to complete the purification; providing that this residual ferrocyanide ion is within the range from about 5 to about $80 \times 10^{-6}$ gm./ml.; preparing an inoculum by inoculating the seed mash with spores of a citric-acid-producing and accumulating organism; allowing to incubate to effect a primary growth of the organism at least until the spores have germinated; preparing a main mash, purifying the medium, providing therein residual ferrocyanide ion after purification of from about 10 to about $400 \times 10^{-6}$ gm./ml.; adding at least a portion of said inoculum to the main mash; aerating while a primary growth of the organism and mycelium buildup occurs; providing that the ferrocyanide ion concentration is below about $20 \times 10^{-6}$ gm./ml. for beet molasses media and from about 10 to about $200 \times 10^{-6}$ gm./ml. for cane molasses media; and oxygenating the medium whereby mycelium growth is retarded and citric-acid-producing and accumulating fermentation is obtained.

3. The process of claim 2 wherein excess ferrocyanide ion is removed by the addition of heavy metal ions which form an insoluble precipitate with ferrocyanide.

4. The process of claim 2 wherein said organism is *Aspergillus niger*.

5. The process of claim 2 wherein the oxygen pressure in the system during the oxygenation is from about 1 to about 1.8 atm.

6. A process for the production of citric acid by fermentation comprising preparing a seed mash by diluting beet molasses with water, maintaining the pH at 5–8, treating with water-soluble ferrocyanide in excess of that required to complete the purification, controlling the excess ferrocyanide ion to provide a residual amount thereof within the range of about 5 to about $80 \times 10^{-6}$ gm./ml.; preparing an inoculum by inoculating the seed mash with spores of *Aspergillus niger*; allowing incubation to proceed; preparing a main mash from beet molasses, maintaining the pH therein at 5–9, purifying the medium, controlling the residual ferrocyanide ion after purification to provide from about 10 to about $200 \times 10^{-6}$ gm./ml. thereof; adding at least a portion of said inoculum to the main mash; dispersing air throughout the mash to effect rapid mycelium growth; providing the residual ferrocyanide ion concentration is below about $20 \times 10^{-6}$ gm./ml.; and dispersing oxygen throughout the mash to effect citric acid production and accumulation.

7. The process of claim 6 wherein an oxygen pressure of from about 1.0 to about 1.8 atm. is provided for oxygenation.

8. The process of claim 6 wherein the residual concentration of ferrocyanide ion is from about 10 to about $40 \times 10^{-6}$ gm./ml. at inoculation.

9. A process for producing citric acid by fermentation comprising preparing a seed mash by diluting molasses with water, adding a water-soluble ferrocyanide in excess of that required for complete purification, controlling the residual ferrocyanide ion concentration to form about 5 to about $200 \times 10^{-6}$ gm./ml.; preparing an inoculum by inoculating the seed mash with spores of *Aspergillus niger*; allowing to incubate with aeration; preparing a main mash from cane molasses, purifying the medium, controlling the residual ferrocyanide ion after purification to provide from about 10 to about $200 \times 10^{-6}$ gm./ml.; transferring at least part of said inoculum to at least part of said main mash; aerating to permit mycelium buildup; providing that the ferrocyanide ion concentration is maintained above about 10 and below about $200 \times 10^{-6}$ gm./ml. throughout the fermentation; and oxygenating the medium until the desired conversion to citric acid is realized.

10. The process of claim 9 wherein an oxygen pressure of from about 1.0 to about 1.8 atm. is provided for oxygenation.

11. The process of claim 9 wherein beet molasses is used to prepare the seed mash.

12. The process of claim 9 wherein the ferrocyanide ion concentration during the aeration stage is from about 10 to about $40 \times 10^{-6}$ gm./ml. and during the oxygenation stage is from about 40 to about $150 \times 10^{-6}$ gm./ml.

13. The process of claim 9 wherein the ferrocyanide ion concentration is from about 30 to about $150 \times 10^{-6}$ gm./ml. at inoculation.

14. In a process for the production of citric acid by fermentation of a sugar-containing medium wherein Fe(CN)$_6$ ion is utilized to purify the medium and condition the mold, the improvement which comprises controlling after purification the residual ferrocyanide ion by:

(a) providing the Fe(CN)$_6$ ion in a residual concentration of from about 10 to about 200×10$^{-6}$ gm./ml. at inoculation; and (b) for the secondary citric-acid-producing stage providing that residual Fe(CN)$_6$ ion concentration is below about 20×10$^{-6}$ gm./ml. for beet molasses media and above about 20×10$^{-6}$ gm./ml. for cane molasses media.

15. The process of claim 14 wherein beet molasses is used and residual Fe(CN)$_6$ ion within the range from about 10 to about 40×10$^{-6}$ gm./ml. is provided at inoculation.

16. The process of claim 14 wherein cane molasses is used and residual Fe(CN)$_6$ ion within the range from about 30 to about 150×10$^{-6}$ gm./ml. is provided at inoculation.

17. In a process for the production of citric acid by fermentation of a sugar-containing medium wherein Fe(CN)$_6$ ion is utilized to purify the medium and condition the mold, the improvement which comprises providing residual Fe(CN)$_6$ ion after purification and controlling the amount of this residual to give optimum citric acid yields by at least one of the following steps:

(a) providing that the Fe(CN)$_6$ ion residual after purification and before inoculation is within the range of from about 10 to about 200×10$^{-6}$ gm./ml. and adjusting this ion residual for the citric-acid-producing stage by adding at least one ion from the group consisting of zinc, copper, cadmium, and further Fe(CN)$_6$ ion;

(b) removing substantially all residual Fe(CN)$_6$ ion after purification and adding from about 10 to about 40×10$^{-6}$ gm./ml. before inoculation; and (c) measuring the residual Fe(CN)$_6$ ion concentration after purification and adjusting this residual to from about 10 to about 40×10$^{-6}$ gm./ml. before inoculation.

18. In a process for the production of citric acid by fermentation of a sugar-containing medium wherein Fe(CN)$_6$ ion is utilized to purify the medium and condition the mold, the improvement comprising adding Fe(CN)$_6$ ion in excess of that required to complete the purification and removing at least a portion of the residual Fe(CN)$_6$ ion by adding a heavy metal ion which forms an insoluble precipitate with Fe(CN)$_6$ ion, the residual Fe(CN)$_6$ ion at inoculation being from about 10 to about 100×10$^{-6}$ gm./ml.

References Cited in the file of this patent

UNITED STATES PATENTS 2,739,923    Martin _____ Mar. 27, 1956

OTHER REFERENCES

Marier and Clark: The Analyst 85, 574–579 (August 1960), QD 71A 45.

Zhuravleva: Chemical Abstracts, vol. 54 (1960), 6022i to 6023a.

Leopold: Nahrung 3, 1001–1017 (1959), English Summary abstracted in C.A. 54, 17786e to 17787a (1960).

Canadian Journal of Microbiology, vol. 1, pages 150–157, 299–311, 644–652 (1954).

Industrial Microbiology, 3rd Edition (1959), pages 54–553, QR151P7.

Copy of above publications available in the Patent Office Scientific Library.